United States Patent
Forthmann et al.

(10) Patent No.: US 7,992,376 B2
(45) Date of Patent: Aug. 9, 2011

(54) METHOD FOR METERING A FUEL INTO AN EXHAUST DUCT OF AN INTERNAL COMBUSTION ENGINE AND A DEVICE FOR IMPLEMENTING THE METHOD

(75) Inventors: Stefan Forthmann, Ludwigsburg (DE); Carsten Becker, Kernen I.R. (DE); Joerg Frauhammer, Gemmrigheim (DE); Andreas Fritsch, Waiblingen (DE); Stefan Motz, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 540 days.

(21) Appl. No.: 11/113,257

(22) Filed: Apr. 22, 2005

(65) Prior Publication Data

US 2005/0284131 A1 Dec. 29, 2005

(30) Foreign Application Priority Data

Jun. 29, 2004 (DE) .......... 10 2004 031 321

(51) Int. Cl.
*F01N 3/00* (2006.01)
(52) U.S. Cl. ............ 60/286; 60/274; 60/276; 60/303
(58) Field of Classification Search ............ 60/274, 60/276, 286, 300, 303
See application file for complete search history.

(56) References Cited

U.S. PATENT DOCUMENTS

| | | | |
|---|---|---|---|
| 5,193,340 A | | 3/1993 | Kamihara |
| 6,487,852 B1 * | | 12/2002 | Murphy et al. .......... 60/286 |
| 6,813,882 B2 * | | 11/2004 | Hepburn et al. ......... 60/286 |
| 6,823,663 B2 * | | 11/2004 | Hammerle et al. ...... 60/286 |
| 6,928,806 B2 * | | 8/2005 | Tennison et al. ........ 60/286 |
| 6,990,854 B2 * | | 1/2006 | van Nieuwstadt et al. .. 73/118.1 |

FOREIGN PATENT DOCUMENTS

| | | |
|---|---|---|
| DE | 41 15 380 | 11/1991 |
| DE | 44 26 020 | 2/1996 |
| EP | 1 130 227 | 9/2001 |
| FR | 2 811 370 | 1/2002 |
| JP | 2003-254038 | 9/2003 |
| WO | WO 02 38932 | 5/2002 |

* cited by examiner

*Primary Examiner* — Thomas E Denion
*Assistant Examiner* — Diem Tran
(74) *Attorney, Agent, or Firm* — Kenyon & Kenyon LLP

(57) ABSTRACT

A method for metering a fuel into at least one exhaust duct of an internal combustion engine and a device for implementing the method. The fuel is converted in an exothermic reaction for achieving a specified setpoint temperature of a component to be heated. The required metering quantity of the fuel is calculated with the inclusion of a model of the exothermic reaction. The method makes it possible to achieve the specified setpoint temperature of the component to be heated or of the exhaust gas in front of the component to be heated using a minimal quantity of fuel.

10 Claims, 2 Drawing Sheets

METHOD FOR METERING A FUEL INTO AN EXHAUST DUCT OF AN INTERNAL COMBUSTION ENGINE AND A DEVICE FOR IMPLEMENTING THE METHOD

BACKGROUND INFORMATION

European Patent Application No. EP 1 130 227 describes a system for supporting the regeneration of a particle filter situated in an-exhaust duct of a diesel engine, in which the exhaust gas temperature for starting and maintaining the particle filter regeneration is raised by introducing hydrocarbons into the exhaust duct. The exhaust gas temperature is measured in front of an oxidation catalytic converter, behind a diesel particle filter situated next to the catalytic converter as well as between the catalytic converter and the particle filter. The starting point is a specified exhaust gas setpoint temperature to which the diesel particle filter must be brought for initiating the regeneration. The exhaust gas setpoint temperature is essentially raised by a secondary injection of diesel fuel, which results in an increased hydrocarbon content in the exhaust gas, which reacts exothermically in the oxidation catalytic converter. The secondary injections are maintained at least until the specified exhaust gas setpoint temperature is measured.

German Patent Application No. DE 44 26 020 describes a method for monitoring the functionality of a catalytic converter situated in an exhaust duct of an internal combustion engine, which begins from two temperature signals. The first temperature signal is measured downstream of the catalytic converter. The second temperature signal is ascertained using a model that reflects a temperature rise by an exothermic reaction of hydrocarbons in the catalytic converter. Subsequently, the two temperature signals are adjusted in a specified operating state of the internal combustion engine. In the subsequent operation of the internal combustion engine, the catalytic converter is diagnosed by comparing the two temperature signals.

The present invention is based on an objective of providing a method for metering a fuel into an exhaust duct of an internal combustion engine and a device for implementing the method, which allow for metering that is as exact as possible.

SUMMARY OF THE INVENTION

The present invention assumes that a fuel is metered into at least one exhaust duct of an internal combustion engine, which is converted in an exothermic reaction for raising the temperature of at least one component to be heated. The metering quantity required for achieving a specified setpoint temperature of the component to be heated or of the exhaust gas in front of the component to be heated is calculated with the inclusion of a model of the exothermic reaction.

The procedure according to the present invention has the important advantage that the specified setpoint temperature either of the component to be heated itself or at least of the exhaust gas in front of the component to be heated is achieved by a minimal metering quantity of the fuel. The fuel saving achieved with respect to the related art is due to the fact that the calculation of the metering quantity already takes into account a temperature rise by the exothermic reaction ascertainable with the aid of the model. An excessive metering fuel is thus avoided.

The heating of the component, which is a catalytic converter and/or a particle filter for example, allows for a rapid adjustment of the required operating temperature of the component.

If the component is a catalytic converter, a minimal quantity of fuel can achieve a temperature level at which an optimum conversion can occur. The catalytic converter may possibly need to be heated in order to ensure that the temperature level is maintained. Another application is the heating of an adsorption catalyst, particularly an NOx adsorption catalyst, which during the regeneration may possibly have to be brought to a raised temperature vis-à-vis the adsorption operation. Adsorption catalysts require a raised temperature particularly for desulphating. As a further example of a component to be heated, a particle filter must be heated to initiate and subsequently maintain a regeneration, in which the embedded particles are incinerated.

The exothermic reaction can occur in the component to be heated itself. The exothermic reaction is supported by a catalytically active coating of the component. Alternatively or additionally, there may be a provision for heating the exhaust gas to the specified setpoint temperature in front of the component to be heated. In this case, the heated exhaust gas essentially heats the component to be heated.

The model of the exothermic reaction at the basis of the present invention specifies what temperature rise is to be expected at the respective operating point.

A refinement provides for the metering quantity to be calculated as a function of at least one measure for the exhaust gas mass flow.

The required metering quantity of fuel may be calculated from the required temperature rise, the gross calorific value of the fuel, the measure for the exhaust gas mass flow, the specific thermal capacity of the exhaust gas mass flow as well as with the aid of the model.

A further refinement provides for the metering quantity to be calculated as a function of a measure of the exhaust gas temperature in front of the component to be heated. It is possible to calculate the required fuel metering quantity even more precisely if the measure of the exhaust gas temperature in front of the component to be heated is known.

The exhaust gas mass flow is preferably calculated from known performance characteristics of the internal combustion engine. The exhaust gas temperature may likewise be calculated from known performance characteristics of the internal combustion engine or it can be measured using an exhaust gas temperature sensor.

A refinement provides for a characteristic quantity of a specified change over time of the temperature of the component to be heated or of the exhaust gas temperature in front of the component to be heated to be taken into account in calculating the metering quantity. As characteristic value of the specified change over time, for example, the rise and/or the curvature of the specified time characteristic of the temperature is provided, which corresponds to the first or second derivative with respect to time. This measure allows for a characteristic of the temperature to be selectively specified. In particular, the measure allows for the implementation of selectively specified changes following a stationary state. In the event of load changes or non-stationary processes, this measure allows for a selective adjustment of the fuel quantity to be introduced so as to achieve as quickly and as precisely as possible the specified setpoint temperature of the component to be heated or of the exhaust gas in front of the component to be heated.

A refinement provides for model of the exothermic reaction to take into account as well a region of the exhaust duct bordering the location of the reaction. This measure is particularly advantageous if the exhaust gas in front of the component to be heated is to be heated to the specified setpoint temperature and the exothermic reaction occurs a longer distance in front of the component to be heated.

The device according to the present invention essentially relates to a control unit where the model is stored and the calculations are performed. The device furthermore relates to a storage medium, which contains the model and the calculations in an encoded form. Data can be written onto the storage medium at the manufacturer or using remote data transmission, for example via the Internet.

DETAILED DESCRIPTION

Figure 1:
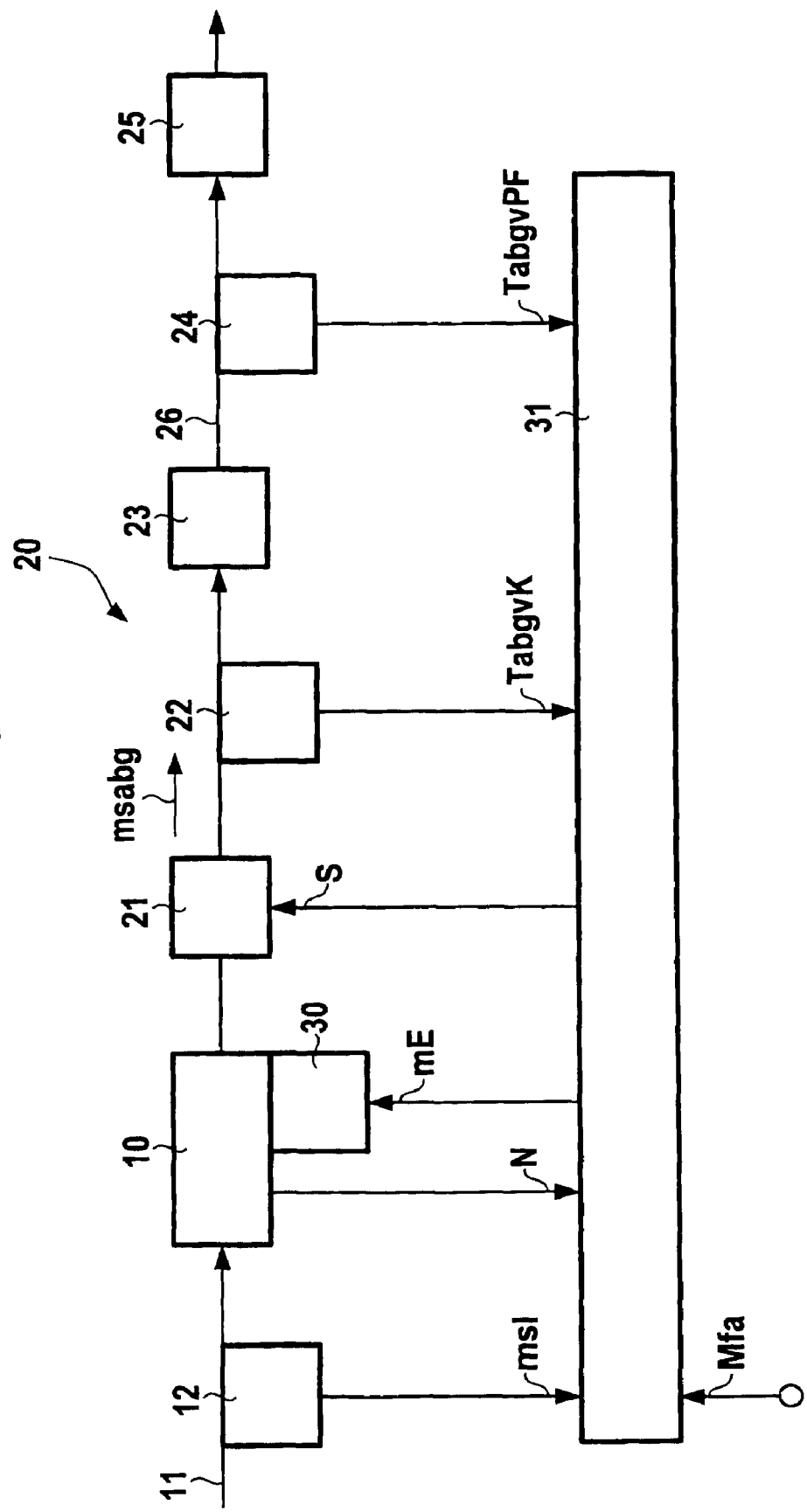
FIG. 1 shows a technical environment in which a method according to the present invention is implemented.

FIG. 1 shows an internal combustion engine 10 having an air sensor 12 located in its intake duct 11 and a fuel introduction device 21, a first exhaust gas temperature sensor 22, a catalytic converter 23, a second exhaust gas temperature sensor 24 as well as a particle filter 25 located in its exhaust duct 20. Between catalytic converter 23 and particle filter 25 there is a specified exhaust gas region 26 bordering catalytic converter 23. Exhaust gas mass flow msabg occurs in exhaust duct 20.

Internal combustion engine 10 is assigned a fuel metering device 30, which provides a fuel signal mE to a control unit 31. Control unit 31 provides a control signal S to fuel introduction device 21.

Air sensor 12 provides to control unit 31 an air signal msL, internal combustion engine 10 provides a rotational speed N, first exhaust gas temperature sensor 22 a first actual exhaust gas temperature TabgvK, and second exhaust gas temperature sensor 24 a second actual exhaust gas temperature TabgvPF. Control unit 31 is provided with a torque setpoint signal Mfa.

Figure 2:
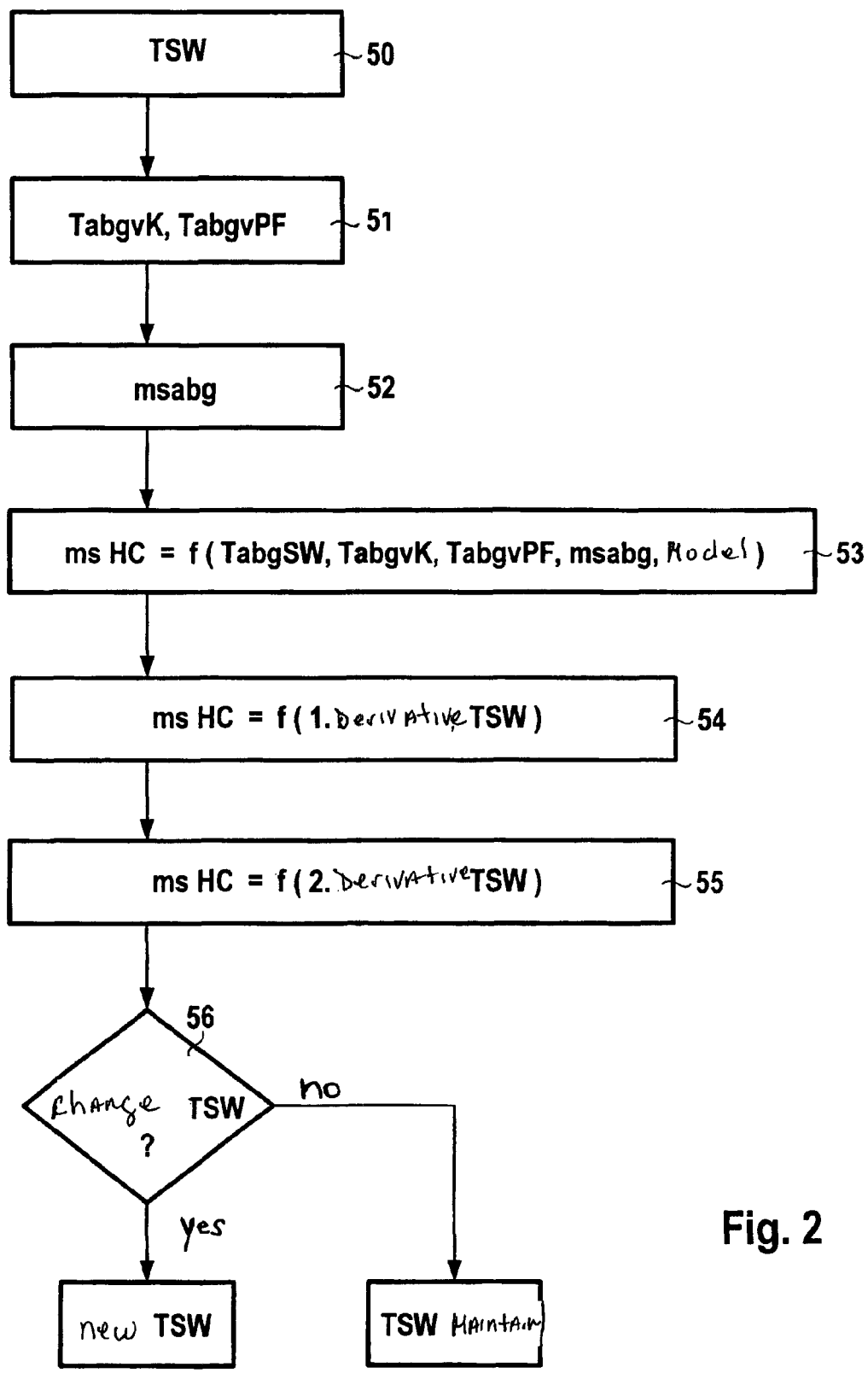
FIG. 2 shows the functional sequence of the method according to the present invention.

The method sequence shown in FIG. 2 begins in a first step 50 with the establishment of a setpoint temperature TSW. In a second step 51, the first and second actual exhaust gas temperature TabgvK, TabgvPF is ascertained. In a third step 52, the exhaust gas mass flow msabg is ascertained. In a fourth step 53, a metering quantity msHC is calculated. In a fifth step 54, the metering quantity msHC is modified for the first time and in a sixth step 55 is modified once more. In a subsequent query 56, a check is performed as to whether setpoint temperature TSW is to be maintained or changed.

The method according to the present invention functions as follows:

Control unit 31 establishes fuel signal mE first as a function of torque setpoint value Mfa, which depends for example on the position of an accelerator pedal (not shown) of a motor vehicle. Fuel signal mE prompts fuel metering device 30 to provide a specified quantity of fuel to internal combustion engine 10 at least at one specified point in time. In establishing fuel signal mE, control unit 31 may, if indicated, additionally take into account the air signal msL provided by air sensor 12 and/or rotational speed N provided by internal combustion engine 10.

The exhaust gas of internal combustion engine 10 is fed into at least one exhaust duct 20. In the exemplary embodiment shown, catalytic converter 23 and particle filter 25 are located in exhaust duct 20. Catalytic converter 23 stores and/or converts certain exhaust gas components, while particle filter 25 stores the particles contained in the exhaust gas.

The catalytic reaction occurring in catalytic converter 23 proceeds optimally within a known temperature range. If an adsorption catalyst, particularly an NOx adsorption catalyst, is used, then a temperature range that is elevated with respect to the adsorption operation may be required for regeneration.

As a function of the load condition, particle filter 25 requires a regeneration that is carried out by an incineration of the particles. A specific start temperature is required for initiating the regeneration. For maintaining the regeneration, a specific temperature level must generally be maintained as well, which the exothermic oxidation reaction during the regeneration is not able to maintain reliably. Catalytic converter 23 and particle filter 25 are examples of components to be heated.

Heating is achieved by introducing the fuel into exhaust duct 10 of internal combustion engine 10, which in an exothermic reaction contributes toward raising the temperature of the component to be heated 23, 25 to the specified setpoint temperature TSW. The exothermic reaction may take place directly in the component to be heated 23, 25 itself. If the component to be heated 23, 25 takes the form of catalytic converter 23, catalytically active surfaces already exist. If the component to be heated 23, 25 normally does not have a catalytic surface, as is the case with particle filter 25 for example, then an appropriate catalytically active coating may be applied.

Another approach is to heat the exhaust gas in front of the component to be heated 23, 25 to setpoint temperature TSW by the exothermic reaction. In this case, the exothermic reaction occurs for example on a catalytically active surface which is to be located in front of the component to be heated 23, 25. The component to be heated 23, 25 in this case is heated indirectly via the heated exhaust gas.

In the exemplary embodiment shown, the catalytically active surface may be provided by catalytic converter 23, which is an oxidation catalytic converter for example. In this case, the component to be heated 23, 25 is particle filter 25 located behind catalytic converter 23.

It is also possible to raise the exhaust gas temperature without the support of a catalytic surface via a reaction of the fuel with a secondary air (not shown) introduced into exhaust duct 20, which results in the formation of an exothermic reaction zone in front of component to be heated 23, 25.

The model models the exothermic reaction regardless of whether it occurs in a catalytic converter located in front of the component to be heated 23, 25, directly in the component to be heated 23, 25 itself, or merely in exhaust duct 20. If necessary, the model formation is to include specified exhaust gas region 26, which generally results in a temperature reduction due to thermal conduction and thermal radiation.

In the exemplary embodiment shown, first actual exhaust gas temperature TabqvK measured by first temperature sensor 22 can be included as a starting point for a required temperature rise. It is then possible for second actual exhaust gas temperature TabqvPF measured by second temperature sensor 24 to be the setpoint temperature TSW to be specified, which is measured behind component to be heated 23, 25, ideally however directly in the component to be heated 23, 25.

Hydrocarbons, fuel or combustible gases are provided as fuel for example. The fuel may be produced within the engine or may be introduced into exhaust duct 20 by fuel introduction device 21. The introduction of fuel into the engine may be accomplished in that fuel metering device 30 performs at least one non-combusting fuel injection following the main combustion. Fuel introduction device 21 shown in the exemplary embodiment is an example for a possibility of implementing the introduction of fuel into exhaust duct 20 outside of the engine. In this case, control unit 31 also determines the time and the quantity using control signal S.

The method sequence begins with the establishment of setpoint temperature TSW in first step 50. In a simplified variant of the procedure according to the present invention, first step 50 may be followed directly by third step 52, in which a measure for exhaust gas mass flow msabg is ascertained.

If indicated, the second step is provided, which provides for the exhaust gas temperature to be ascertained in front of the component to be heated 23, 25. First actual exhaust gas temperature TabgvK and/or second actual exhaust gas temperature TabgvPF are provided in the exemplary embodiment shown.

In fourth step 54, metering quantity msHC is established at least as a function of setpoint temperature TSW established in first step 50, of the measure for exhaust gas mass flow msabg ascertained in third step 52, and as a function of the model of the exothermic reaction. What is important here is particularly the establishment of the metering quantity msHC as a function of the model. Compared to the procedures that have become known so far, this yields the advantage that the effects of measures to be taken can already be taken into account when determining the measures.

Advantageously, in the fourth step 53, the metering quantity msHC is additionally established as a function of first actual exhaust gas temperature TabgvK and/or second actual exhaust gas temperature TabgvPF.

An advantageous refinement of the procedure according to the present invention provides for the metering quantity msHC to be established as a function of a characteristic quantity of a change of setpoint temperature TSW. This measure makes it possible to adjust the temperature characteristic occurring during and following the exothermic reaction selectively to a specified time characteristic of setpoint temperature TSW.

Fifth step 54 provides for the modification of the metering quantity msHC as a function of the first derivative of the specified time characteristic of setpoint temperature TSW. Sixth step 55 provides a further modification as a function of the second derivative of the specified time characteristic of setpoint temperature TSW. The first derivative corresponds to the rise and the second derivative to the curvature of the time characteristic of setpoint temperature TSW to be specified.

An implementation of the formation of the derivative functions is possible for example by calculating differential quotient, it being possible to provide more nodes in regions of greater changes of the time characteristic of setpoint temperature TSW to be specified than in regions of fewer changes.

Following sixth step 55, a check may be provided to determine whether specified setpoint temperature TSW has already been reached. Additionally there may be a provision to maintain setpoint temperature TSW at specified setpoint temperature TSW for a specified time or until the occurrence of an event. Such an event is for example a signal which signals the regeneration termination of catalytic converter 23 designed as an adsorption catalyst or of particle filter 25 as the components to be heated 23, 25.

In the exemplary embodiment shown, therefore, a check is provided in query 56 to determine whether setpoint temperature TSW to be specified is to be changed. If this is not the case, setpoint temperature TSW is maintained. If this is the case, the new setpoint temperature TSW is specified. Subsequently, the system branches back to first step 50. The entire method sequence is run through in a continuous cycle.

Setpoint temperature TSW may be set by a pure open-loop control, the changes in exhaust duct 20 produced by a change of the operating state of internal combustion engine 10 being taken into account in the calculation of the control variable. Of course, a closed-loop control of the specified setpoint temperature TSW may be provided as well. In the closed-loop control, the temperature of component to be heated 23, 25 is suitably measured so as to be able to compare the actual temperature with the desired setpoint temperature TSW. Alternatively, the exhaust gas temperature may be measured behind the component to be heated 23, 25 and may be assessed as the measure for the actual temperature of the component to be heated 23, 25.

In the formation of the model, the mass of the components to be included 23, 25 and the specific thermal capacity of components 23, 25 may be taken into account.

Furthers it is also possible to model the heat transfers between the components 23, 25 and the surroundings.

The required metering quantity msHC of fuel may be calculated from the required temperature rise, the gross calorific value of the fuel, the measure for the exhaust gas mass flow msabg, the specific thermal capacity of the exhaust gas mass flow as well as with the aid of the stored model.

In a simple refinement, the measure for exhaust gas mass flow msabg may be ascertained already from air signal msL provided by air sensor 12 located in intake duct 11 of internal combustion engine 10. If required, fuel signal mE may be taken into account as well. First actual exhaust gas temperature TabgvK in front of the exothermic reaction and second actual exhaust gas temperature TabgvPF, if it occurs in front of the component to be heated 23, 25, may also be calculated from air signal msL with the inclusion of fuel signal mE and/or an exhaust gas recirculation rate and/or the surrounding air temperature. Temperature sensor 22, 24 may thus be omitted.

What is claimed is:

1. A method for metering a fuel in at least one exhaust duct of an internal combustion engine, which is converted in an exothermic reaction for raising a temperature of a component to be heated, the method comprising:
specifying a setpoint temperature of one of (a) the component to be heated and (b) an exhaust gas in front of the component to be heated; and
calculating a metering quantity of the fuel with an inclusion of a model of the exothermic reaction, to reach the specified setpoint temperature.

2. The method according to claim 1, wherein the exothermic reaction takes place in a particle filter and the model takes the particle filter into account.

3. The method according to claim 1, wherein the metering quantity is calculated as a function of a measure for an exhaust gas mass flow.

4. The method according to claim 3, wherein the metering quantity is calculated as a function of an exhaust gas temperature, which appears in front of the component to be heated.

5. The method according to claim 4, further comprising measuring at least one of the actual exhaust gas temperature and an actual temperature of the component to be heated by at least one temperature sensor.

6. The method according to claim 1, wherein in calculating the metering quantity at least one characteristic quantity of a change of the setpoint temperature is taken into account.

7. The method according to claim 6, wherein as a characteristic quantity of a change of the setpoint temperature at least one of a rise and a curvature of a characteristic of the setpoint temperature is taken into account.

8. The method according to claim 1, wherein the exothermic reaction takes place in a catalytic converter and the model takes the catalytic converter into account.

9. The method according to claim 8, wherein the model takes into account a specified exhaust gas region bordering the catalytic converter.

10. A device for metering a fuel in at least one exhaust duct of an internal combustion engine, which is converted in an exothermic reaction for raising a temperature of a component to be heated, the device comprising:

means for specifying a setpoint temperature of one of (a) the component to be heated and (b) an exhaust, gas in front of the component to be heated; and means for, calculating a metering quantity of the fuel with an inclusion of a model of the exothermic reaction, to reach the specified setpoint temperature.

* * * * *